April 29, 1952  G. T. MUEHLENKAMP  2,594,972
ELECTRIC FURNACE
Filed June 15, 1949  2 SHEETS—SHEET 1

INVENTOR.
G. T. MUEHLENKAMP
BY
ATT'Y.

April 29, 1952     G. T. MUEHLENKAMP     2,594,972

ELECTRIC FURNACE

Filed June 15, 1949     2 SHEETS—SHEET 2

*INVENTOR.*
G. T. MUEHLENKAMP
BY
ATT'Y.

Patented Apr. 29, 1952

2,594,972

UNITED STATES PATENT OFFICE 2,594,972

ELECTRIC FURNACE

George T. Muehlenkamp, Columbus, Ohio, assignor, by mesne assignments, to Fostoria Glass Company, Moundsville, W. Va., a corporation of West Virginia Application June 15, 1949, Serial No. 99,200

17 Claims. (Cl. 13—6)

This invention relates to the production of glass and more particularly to an electric furnace and its construction and operation in the melting and refining of materials employed in the manufacture of glass.

The furnace of the present invention is particularly adapted for use in a batch or intermittent process of producing glass in which the furnace is charged with raw materials until the molten glass reaches the desired level or a sufficient quantity is contained, after which the refining process is carried out and glass is removed from the mass until there is little left within the tank or furnace. The furnace is then recharged, and heating is continued during the off period or is begun in time to have a body of glass heated ready for use the following day so that the process may be repeated. This is to be distinguished from a continuous process in which raw materials are continuously added to the furnace as refined glass is withdrawn.

Electrical heating in the production of glass offers certain advantages as well as certain disadvantages. Temperature can be more accurately and satisfactorily controlled, although the cost of electricity is generally higher and with its use it is necessary to have the tank or furnace constructed of improved refractory material or else frequently renew parts thereof, with resultant shutdowns.

Other problems in the use of electrical heating include the provision of electrodes of appropriate size, configuration, and arrangement and a furnace or tank from which a precipitate may be withdrawn which is sometimes necessary in the production of lead glass.

Among the objects of the invention is to provide for use in the production of glass a furnace having minimum objectionable features and which not only can be satisfactorily employed in the production of ordinary glass but glass having a high lead content, such furnace being so constructed that precipitated lead can be withdrawn without having to permit the furnace to cool.

A further object of the invention is to provide a novel method for the production of glass.

Figures 1, 2:
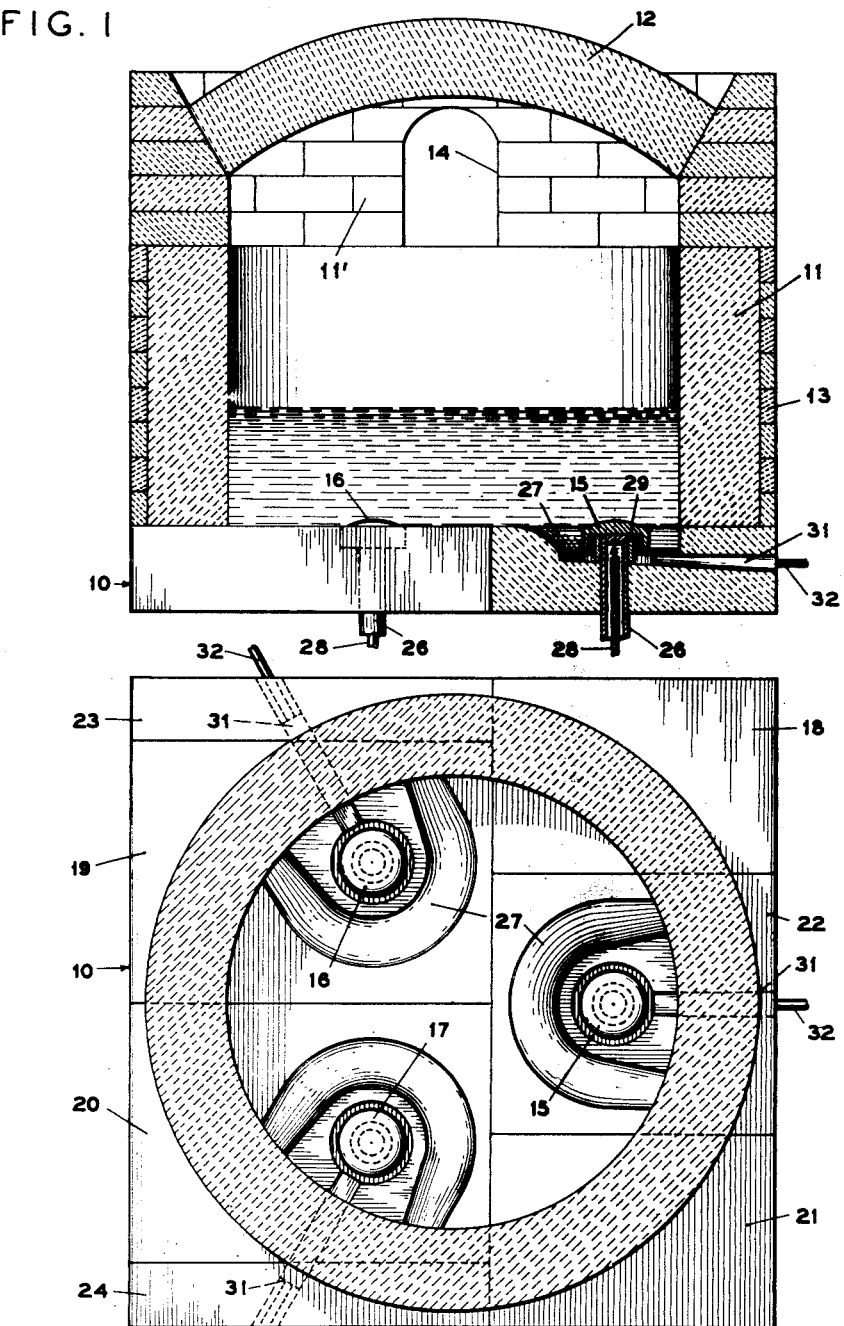
Figure 3:
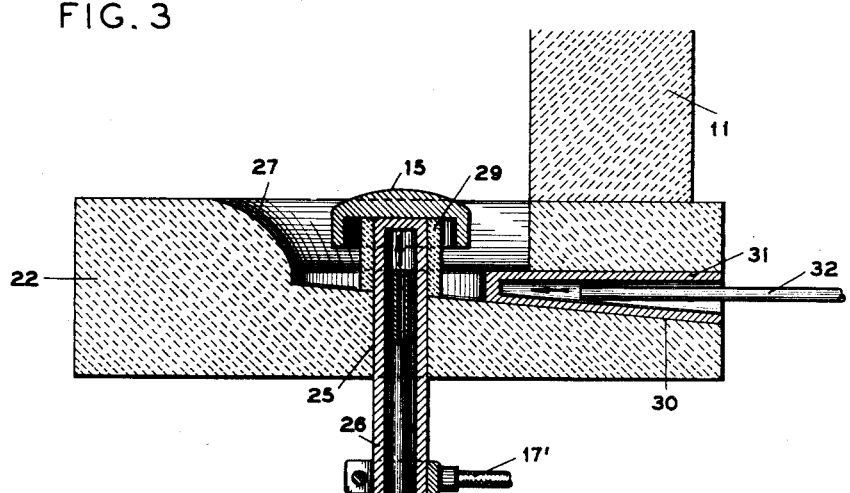
Figure 4:
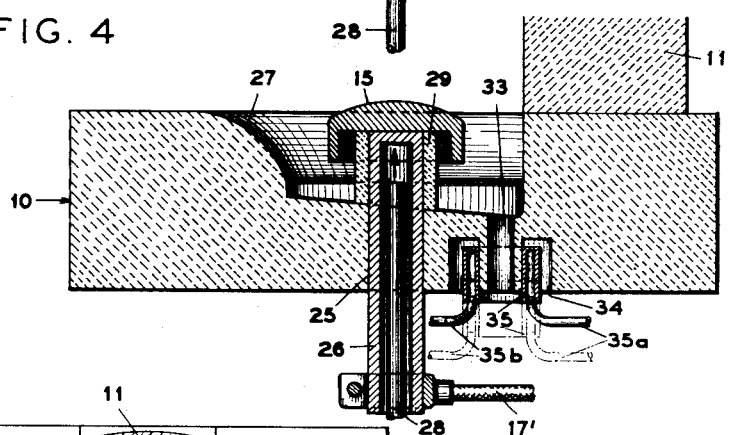
Figure 5:
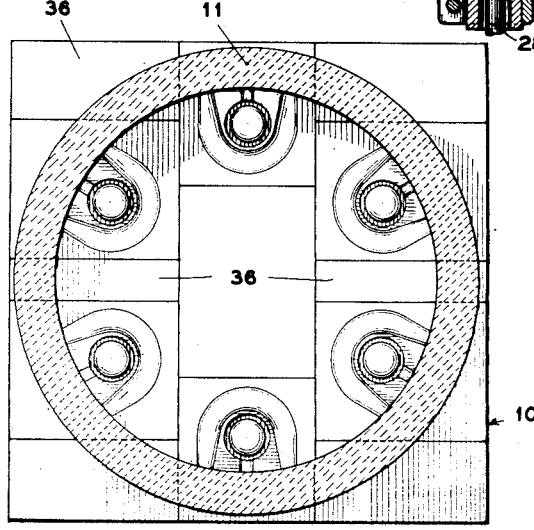

Further objects and advantages of the invention will be apparent from the following description taken in conjunction with the accompanying drawings, wherein:

Fig. 1 is a vertical section of a furnace constructed in accordance with the present invention;

Fig. 2, a section on the line 2—2 of Fig. 1;

Fig. 3, a section showing the details of an electrode and the associated well structure;

Fig. 4, a section showing the details of a modified electrode and associated structure; and, Fig. 5, a view similar to Fig. 2 showing a modified arrangement of the electrode blocks.

Referring to the drawings, a furnace in accordance with the present invention is shown in Fig. 1 and includes a hearth 10 having walls 11 and an arch or cover 12. The furnace may rest directly on a floor or be spaced therefrom by suitable supports, not shown. The hearth 10 and wall 11 of the furnace are constructed of a refractory material which is especially adapted to resist the corrosion attendant upon its contact with the molten material in the furnace. A layer of refractory brick 13 may be placed around the outside of the wall, and that portion of the wall 11 above the level of the charge and the molten material may be constructed of a refractory brick instead of being constructed of the same material as the hearth and side walls 10 and 11 constituting the receptacle or tank. An opening 14 is provided in the wall 11 through which the charge may be introduced and the finished glass withdrawn.

In order to conduct current to the material in the tank, a plurality of "mushroom" shaped electrodes 15, 16 and 17 are positioned on the bottom of the hearth. The curved upper surface of the electrodes as shown in the drawing is provided primarily to prevent the collection of precipitated lead thereon. Each of the electrodes is supported by a cylindrical conducting member or support 26 to which is clamped conductors 17' for supplying three phase current to the furnace. In order that the entire mass within the furnace may be heated as evenly as possible, the furnace is circular in section, as shown in Fig. 2, and the electrodes are evenly spaced from the center thereof and from each other, each being spaced 120° around the circle.

Where three electrodes are used as shown in the drawing, it has been found convenient to employ substantially rectangular blocks into which each may be set and the arrangement of the electrodes within the blocks and the arrangement of the blocks with relation to each other and the other blocks necessary for making up the furnace is of particular importance. In Fig. 2, for example, it is apparent that the refractory blocks 18, 19, 20, 21 and 22 have the same overall dimensions and that the blocks 23 and 24 are likewise similar to each other. Each of the blocks 19, 20 and 22 includes a bore 25 for the reception of the electrode support 26, and has a sunken portion or well 27 which is adapted to collect molten lead during the melting process. The side walls of well 27 as shown in the drawing are curved in order to prevent a concentration of heat which would take place if the walls terminated in a sharp corner. Pipes 28 within the supports 26 are adapted to supply cooling fluid to the electrode supports. It is also to be noted that the mounting of the electrodes in individual blocks permits the removal and replacement of one electrode without disturbing the others.

A collar 29 is provided for the exposed portion of each electrode support 26 which is within the furnace. The electrodes are of such size as to present a substantial area to the contents of the furnace in order that the current density adjacent the electrode may be of the proper proportion in relation to that found in the rest of the batch. The electrode together with its support extending out of the floor of the furnace is of a configuration similar to that of a mushroom and is particularly adapted for properly distributing current to the material in the furnace.

Each of the blocks 19, 20 and 22 is provided with a channel 30 in which a tapered plug 31 is normally positioned as a closure for the channel and which may be withdrawn at intervals in order that molten lead collected in the well 27 may be drawn off. The plug 31 is supplied with cooling liquid through a conduit 32 in order to protect the same from excessive corrosion and to solidify the molten glass and stop flow thereof through the channel 30.

By forming the block 22 with the well in alignment with the axis of the block and the blocks 19 and 20 with the wells thereof inclined to the axis of the respective blocks, and by spacing the wells at appropriate distances from the borders of the blocks, substantially rectangular blocks may be arranged as shown in Fig. 2, in such a manner that the wells are symmetrically arranged for the reception of the electrodes as described above. When it is necessary to repair or replace the furnace lining, the block or blocks affected may be easily removed and new ones substituted. A substantial saving in replacement material and time cost is possible compared to that necessary where the receptacle is constructed of massive unwieldy parts.

In Fig. 4 a modification of the furnace structure is shown in which a discharge opening 33 is provided in the bottom of the furnace adjacent the electrode for the drawing off of molten lead. A portion of the wall of opening 33 is surrounded by an annular recess 34 in which is removably disposed a cooling jacket 35 through which water or other cooling medium may be circulated by means of inlet conduit 35a and discharge conduit 35b. When positioned as shown in full lines in Fig. 4 the cooling jacket 35 will serve to cool and solidify material flowing through opening 33 thus stopping such flow and upon movement of jacket 35 to the position shown in dotted lines the heat of the adjacent material in the well 27 will be sufficient to melt the solidified material in opening 33 and permit flow therethrough to draw off the molten lead or other material.

This structure provides a convenient means whereby flow of metal through opening 33 may be controlled without the necessity of utilizing a plug or other means to close this opening. Obviously variations in the structure of the cooling jacket may be adopted, and in fact this jacket may occupy a fixed position and the flow of material through opening 33 controlled by controlling the flow of cooling medium through the jacket 35.

In Fig. 5 an arrangement of six electrodes is shown instead of three as in the other views. It is apparent that applicant's block construction is adapted for use with any number of electrodes, and the use of three and six is merely illustrative. In using more than three electrodes it is necessary to use an appropriate number of filler blocks 36.

Although the invention is not limited to the use of specific materials, it has been found that the use of a molybdenum electrode is of particular advantage because of its high melting point, and although it is subject to oxidation, its oxide is colorless in glass. Because of its high conductivity and its resistance to corrosion the use of copper for the electrode supports and for the drain closure and cooling coils is desirable.

In the operation of the furnace, a sufficient amount of molten glass is ladled into the furnace to cover the electrodes, or this amount may be left in from the previous operation in order that current may be conducted initially through the mass and also to prevent excess oxidation of the electrodes. After the minimum level of the molten material has been established the raw materials are added and three phase current is then supplied to the electrodes.

From the beginning of the operation until substantially all of the batch has been liquefied, a substantially constant line voltage is used and as the temperature of the molten glass rises, its resistance is reduced and thus the current flowing between the electrodes increases. The current increase is also assisted by the larger section of material through which the current may flow as the level of the molten glass rises. After substantially all of the batch has liquefied the voltage is gradually reduced and at such a rate that the current flow in each phase of the circuit within the furnace remains substantially constant. When a temperature of the material is reached corresponding to that at which the refining operation is carried out, the voltage and amperage are further reduced until just sufficient to maintain the mass at a substantially constant temperature. After the glass is held at this temperature for the desired time, the amperage is further reduced and the glass permitted to cool until it reaches the proper temperature for removal from the furnace.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A furnace for use in the production of glass comprising a receptacle defined by a bottom and side walls of refractory material, a plurality of tubular electrode supports mounted in said bottom and extending therethrough, a molybdenum electrode of mushroom shape and having a curved upper surface to prevent the collection of precipitated lead thereon secured to the upper end of each support, the upper surface of said electrode being substantially in the plane of said bottom whereby said receptacle may be substantially emptied of molten material before exposing said electrode thereby preventing oxidation thereof, conductors secured to the outer ends of said supports, means for circulating a cooling medium within said supports, a well in said bottom and surrounding each electrode, a curved wall connecting said well with said bottom whereby a concentration of heat is prevented, a protective sleeve surrounding each support and extending from the under side of each electrode to the bottom of the adjacent well, a drainage channel communicating with the lowermost point in each well and extending through an outer wall of said vessel whereby molten material in said wells may be removed, a removable closure for each channel comprising a hollow tapered plug closed at its inner end, and means for circulating a cooling medium within said plug.

2. A furnace for use in the production of glass comprising a receptacle defined by bottom and side walls of refractory material, a plurality of electrode supports fixed in said bottom and extending therethrough, an electrode of mushroom shape and having a curved upper surface to prevent the collection of precipitated lead thereon secured to the upper end of each support, the upper surface of said electrode being substantially in the plane of said bottom whereby said receptacle may be substantially emptied of molten material before exposing said electrodes thereby preventing oxidation thereof, conductors secured to the outer ends of said supports, means for cooling said supports, a well formed in said bottom and surrounding each electrode, a curved wall connecting said well with said bottom whereby a concentration of heat is prevented, a protective sleeve surrounding each support and extending from the under side of each electrode to the bottom of each well, a drainage channel communicating with the lowermost point in each well and extending through an outer wall of said receptacle whereby molten material in said wells may be drained off, removable closures for each channel comprising a hollow tapered plug closed at its inner end and means for circulating a cooling medium within said plug.

3. A furnace for use in the production of glass comprising a receptacle having a bottom and side walls, a plurality of electrode supports fixed in said bottom and extending therethrough, an electrode of mushroom shape and having a curved upper surface to prevent the collection of precipitated lead thereon secured to the upper end of each support, the upper surface of said electrode being substantially in the plane of said bottom whereby said receptacle may be substantially emptied of molten material before exposing said electrodes, thereby preventing oxidation thereof, conductors secured to the outer ends of said supports, means for cooling said supports, a well formed in said bottom and surrounding each electrode, a curved wall connecting said well with said bottom whereby a concentration of heat is prevented, a drainage channel communicating with the lower-most point in each well and extending through an outer wall of said receptacle whereby molten material in said wells may be drained off, a removable closure for each channel and means for cooling said closure.

4. A furnace for use in production of glass comprising a receptacle having a bottom and side walls, a plurality of electrodes fixed in said bottom, the upper surface of said electrodes being curved to prevent the collection of precipitated lead thereon and being substantially in the plane of said bottom whereby said receptacle may be substantially emptied of molten material before exposing said electrodes, thereby preventing oxidation thereof, conductors secured to said electrodes, means for cooling a portion of said electrodes, a well formed in said bottom and surrounding each electrode, a curved wall connecting said well with said bottom whereby a concentration of heat is prevented, a drainage channel communicating with each well and extending through an outer wall of said receptacle whereby molten material in said wells may be drained off, a removable closure for each channel and means for cooling said closure.

5. A furnace for use in the production of glass comprising a receptacle having bottom and side walls, a plurality of electrodes fixed in said bottom and having a curved upper surface to prevent the collection of precipitated lead thereon, conductors secured to said electrodes, means for cooling a portion fo said electrodes, a well formed in said bottom and surrounding each electrode, a curved wall connecting said well with said bottom whereby a concentration of heat is prevented, a drainage channel communicating with each well and extending through an outer wall of said receptacle whereby molten material in said wells may be drained off, a removable closure for each channel and means for cooling said closure.

6. A furnace for use in the production of glass comprising a receptacle having bottom and side walls, a plurality of electrodes secured in said bottom and having a curved upper surface to prevent the collection of precipitated lead thereon, conductors secured to said electrodes, a well formed in said bottom and surrounding each electrode, a curved wall connecting said well with said bottom whereby a concentration of heat is prevented, a drainage channel communicating with each well and extending through an outer wall of said receptacle whereby molten material in said wells may be drained off, and a removable closure for each channel.

7. A furnace for use in the production of glass comprising a receptacle defined by a bottom and side walls of refractory material, a plurality of tubular electrode supports fixed in said bottom and extending therethrough, a molybdenum electrode of mushroom shape and having a curved upper surface to prevent the collection of precipitated lead thereon secured to the upper end of each support, the upper surface of said electrode being substantially in the plane of said bottom whereby said receptacle may be substantially emptied of molten material before exposing said electrode thereby preventing oxidation thereof, conductors secured to the outer ends of said supports, means for circulating a cooling medium within said supports, a well formed in said bottom and surrounding each electrode, a curved wall connecting said well with said bottom whereby a concentration of heat is prevented, a protective sleeve surrounding each support and extending from the under side of each electrode to the bottom of each well, a drainage aperture communicating with the lowermost point in each well and extending through an outer wall of said receptacle, a recess surrounding the wall of said drainage aperture, a removable cooling jacket disposed in said recess whereby upon the circulation of a cooling medium through said jacket molten material flowing through said drainage aperture will be solidified thus stopping flow therethrough and upon removal of said cooling jacket the solidified material will be melted whereby molten material in said wells may be drained off.

8. A furnace for use in the production of glass comprising a receptacle defined by bottom and side walls of refractory material, a plurality of electrode supports fixed in said bottom and extending therethrough, an electrode of mushroom shape having a curved upper surface to prevent the collection of precipitated lead thereon secured to the upper end of each support, the upper surface of said electrode being substantially in the plane of said bottom whereby said receptacle may be substantially emptied of molten material before exposing said electrode thereby preventing oxidation thereof, conductors secured to the outer ends of said supports, means for cooling said supports, a well formed in said bottom and surrounding each electrode, a curved wall connecting said well with said bottom whereby a concentration of heat is prevented, a protective sleeve surrounding each support and extending from the under side of each electrode to the bottom of each well, a drainage aperture communicating with the lowermost point in each well and extending through an outer wall of said receptacle, a recess surrounding the wall of said drainage aperture, a removable cooling jacket disposed in said recess whereby upon the circulation of a cooling medium through said jacket, molten material flowing through said drainage aperture will be solidified thus stopping flow therethrough and upon removal of said cooling jacket the solidified material will be melted whereby molten material in said wells may be drained off.

9. A furnace for use in the production of glass comprising a receptacle having a bottom and side walls, a plurality of electrode supports fixed in said bottom and extending therethrough, an electrode of mushroom shape and having a curved upper surface to prevent the collection of precipitated lead thereon secured to the upper end of each support, the upper surface of said electrode being substantially in the plane of said bottom whereby said receptacle may be substantially emptied of molten material before exposing said electrodes, thereby preventing oxidation thereof, conductors secured to the outer ends of said supports, means for cooling said supports, a well formed in said bottom and surrounding each electrode, a curved wall connecting said well with said bottom whereby a concentration of heat is prevented, a drainage aperture communicating with the lowermost point in each well and extending through an outer wall of said receptacle, a recess surrounding the wall of said drainage aperture, a removable cooling jacket disposed in said recess whereby upon the circulation of a cooling medium through said jacket molten material flowing through said drainage aperture will be solidified thus stopping flow therethrough and upon removal of said cooling jacket the solidified material will be melted whereby molten material in said well may be drained off.

10. A furnace for use in the production of glass comprising a receptacle having bottom and side walls, a plurality of electrodes fixed in said bottom, the upper surface of said electrodes being curved to prevent the collection of precipitated lead thereon and being substantially in the plane of said bottom whereby said receptacle may be substantially emptied of molten material before exposing said electrodes, thereby preventing oxidation thereof, conductors secured to said electrodes, means for cooling a portion of said electrodes, a well formed in said bottom and surrounding each electrode, a curved wall connecting said well with said bottom whereby a concentration of heat is prevented, a drainage aperture communicating with the lowermost point in each well and extending through an outer wall of said receptacle, a recess surrounding the wall of said drainage aperture, a removable cooling jacket disposed in said recess whereby upon the circulation of a cooling medium through said jacket, molten material flowing through said drainage aperture will be solidified thus stopping flow therethrough and upon removal of said cooling jacket the solidified material will be melted, whereby molten material in said wells may be drained off.

11. A furnace for use in the production of glass comprising a receptacle having bottom and side walls, a plurality of electrodes fixed in said bottom, the upper surface of said electrodes being curved to prevent the collection of precipitated lead thereon, conductors secured to said electrodes, means for cooling a portion of said electrodes, a well formed in said bottom and surrounding each electrode, a curved wall connecting said well with said bottom whereby a concentration of heat is prevented, a drainage aperture communicating with the lowermost point in each well and extending through an outer wall of said receptacle, a recess surrounding the wall of said drainage aperture, a removable cooling jacket disposed in said recess whereby upon the circulation of a cooling medium through said jacket molten material flowing through said drainage aperture will be solidified thus stopping flow therethrough and upon removal of said cooling jacket the solidified material will be melted whereby molten material in said well may be drained off.

12. A furnace for use in the production of glass comprising a receptacle having bottom and side walls, a plurality of electrodes secured in said bottom, the upper surface of said electrodes being curved to prevent the collection of precipitated lead thereon, conductors secured to said electrodes, a well formed in said bottom and surrounding each electrode, a curved wall connecting said well with said bottom whereby a concentration of heat is prevented, a drainage aperture communicating with the lowermost point in each well and extending through an outer wall of said receptacle whereby molten material in said wells may be drained off, cooling means disposed adjacent said draining aperture whereby molten material flowing therethrough may be solidified thus stopping the flow and whereby upon removal of the cooling medium flow through said aperture may recommence.

13. A furnace for use in the production of glass comprising a receptacle having bottom and side walls, a plurality of electrodes fixed in said bottom, the upper surface of said electrodes being curved to prevent the collection of precipitated lead thereon and being substantially in the plane of said bottom whereby said receptacle may be substantially emptied of molten material before exposing said electrodes, thereby preventing oxidation thereof, conductors secured to said electrodes, means for cooling a portion of said electrodes, a well formed in said bottom and surrounding each electrode, a curved wall connecting said well with said bottom whereby a concentration of heat is prevented, a drainage channel communicating with each well and extending through an outer wall of said receptacle whereby molten material in said wells may be drained off and means for controlling flow through said channel.

14. A furnace for use in the production of glass comprising a receptacle having bottom and side walls, a plurality of electrodes fixed in said bottom, the upper surface of said electrodes being curved to prevent the collection of precipitated lead thereon, conductors secured to said electrodes, means for cooling a portion of said electrodes, a well formed in said bottom and surrounding each electrode, a curved wall connecting said well with said bottom whereby a concentration of heat is prevented, a drainage channel communicating with each well and extending through an outer wall of said receptacle whereby molten material in said wells may be drained off and means for controlling flow through said channel.

15. A furnace as defined in claim 1 in which each electrode is mounted in a block of refractory material forming a portion of said bottom wall whereby one block and associated electrode may be removed and replaced without disturbing the others.

16. A furnace as defined in claim 7 in which each electrode is mounted within a block of refractory material forming a portion of said bottom wall whereby one block and associated electrode may be removed and replaced without disturbing the others.

17. A furnace as defined in claim 13 in which each electrode is mounted within a block of refractory material forming a portion of said bottom wall whereby one block and associated electrode may be removed and replaced without disturbing the others.

GEORGE T. MUEHLENKAMP.

REFERENCES CITED

The following references are of record in the file of this patent:

UNITED STATES PATENTS

| Number | Name | Date |
| --- | --- | --- |
| 469,454 | Rogers | Feb. 23, 1892 |
| 702,081 | Voelker | June 10, 1902 |
| 896,429 | Becket | Aug. 18, 1908 |
| 1,889,516 | McIntosh | Nov. 29, 1932 |
| 1,897,973 | Wadman | Feb. 14, 1933 |
| 2,018,884 | Ferguson | Oct. 29, 1935 |
| 2,018,886 | Ferguson | Oct. 29, 1935 |
| 2,040,215 | Rava | May 12, 1936 |
| 2,186,718 | Ferguson | Jan. 9, 1940 |
| 2,209,515 | Ehman et al. | July 30, 1940 |
| 2,244,267 | Slayter et al. | June 3, 1941 |
| 2,370,467 | Hopkins | Feb. 27, 1945 |
| 2,413,037 | De Voe | Dec. 24, 1946 |
| 2,471,531 | McIntyre et al. | May 31, 1949 |